US011429648B2

(12) United States Patent
Zhang et al.

(10) Patent No.: US 11,429,648 B2
(45) Date of Patent: *Aug. 30, 2022

(54) METHOD AND DEVICE FOR CREATING AN INDEX

(71) Applicant: EMC IP Holding Company LLC, Hopkinton, MA (US)

(72) Inventors: Winston Lei Zhang, Shanghai (CN); Charlie Chen, Shanghai (CN); Kun Wu Huang, Shanghai (CN); Jingjing Liu, Shanghai (CN); Duke Dai, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 101 days.

This patent is subject to a terminal disclaimer.

(21) Appl. No.: 16/860,813

(22) Filed: Apr. 28, 2020

(65) Prior Publication Data

US 2020/0257710 A1 Aug. 13, 2020

Related U.S. Application Data

(63) Continuation of application No. 15/846,650, filed on Dec. 19, 2017, now Pat. No. 10,671,652.

(30) Foreign Application Priority Data

Dec. 21, 2016 (CN) .......................... 201611194037.8

(51) Int. Cl.
*G06F 16/31* (2019.01)
*G06F 16/93* (2019.01)
*G06F 16/951* (2019.01)

(52) U.S. Cl.
CPC .......... *G06F 16/319* (2019.01); *G06F 16/313* (2019.01); *G06F 16/93* (2019.01); *G06F 16/951* (2019.01)

(58) Field of Classification Search
CPC .... G06F 16/319; G06F 16/951; G06F 16/313; G06F 16/93; G06F 16/3331; G06F 16/316
See application file for complete search history.

(56) References Cited

U.S. PATENT DOCUMENTS 6,286,000 B1 9/2001 Apte et al.
8,538,989 B1 9/2013 Datar et al.
(Continued)

FOREIGN PATENT DOCUMENTS

CN 1629835 6/2005
CN 101446959 6/2009
(Continued)

*Primary Examiner* — Jorge A Casanova
(74) *Attorney, Agent, or Firm* — BainwoodHuang

(57) ABSTRACT

Embodiments of the present disclosure generally relate to a method and device for creating an index. For example, the embodiments of the present disclosure propose a method for creating an index, comprising: dividing a document into a plurality of regions; determining the number of times that a token appears in the plurality of regions, the token including at least one character in the document; assigning respective weights to the plurality of regions; and creating an inverted document linked list directed to the token based on the number of times that the token appears in the plurality of regions and respective weights of the plurality of regions. In addition, the embodiments of the present disclosure propose a corresponding device and computer program product for creating an index.

17 Claims, 6 Drawing Sheets

(56) References Cited

U.S. PATENT DOCUMENTS

| | | |
|---|---|---|
| 8,549,016 B2 | 10/2013 | Stefik et al. |
| 9,218,411 B2 * | 12/2015 | Bloomfield ............ G06F 16/313 |
| 2002/0174101 A1 | 11/2002 | Fernley et al. |
| 2005/0138548 A1 | 6/2005 | Liu et al. |
| 2007/0013967 A1 * | 1/2007 | Ebaugh ............... G06F 16/2228 |
| | | 358/448 |
| 2007/0239707 A1 | 10/2007 | Collins et al. |
| 2008/0263023 A1 | 10/2008 | Vailaya et al. |
| 2008/0263033 A1 | 10/2008 | Vailaya et al. |
| 2009/0228777 A1 | 9/2009 | Henry et al. |
| 2010/0287177 A1 | 11/2010 | Resnick et al. |
| 2011/0276564 A1 | 11/2011 | Vailaya et al. |
| 2012/0254161 A1 | 10/2012 | Zhang et al. |
| 2016/0378803 A1 * | 12/2016 | Hopcroft ............... G06F 16/316 |
| | | 707/745 |
| 2017/0060366 A1 | 3/2017 | Alexander et al. |
| 2017/0329839 A1 * | 11/2017 | Fan ...................... G06F 16/338 |
| 2018/0137100 A1 | 5/2018 | Andrade Silva et al. |

FOREIGN PATENT DOCUMENTS

| | | |
|---|---|---|
| CN | 102483744 | 5/2012 |
| CN | 102982153 | 3/2013 |
| CN | 104834736 | 8/2015 |
| CN | 105653737 | 6/2016 |
| CN | 105808524 | 7/2016 |
| CN | 105824956 | 8/2016 |

* cited by examiner

METHOD AND DEVICE FOR CREATING AN INDEX

RELATED APPLICATIONS

This application is a Continuation of U.S. patent application Ser. No. 15/846,650, filed at the U.S. Patent Office on Dec. 19, 2017, entitled "METHOD AND DEVICE FOR CREATING AN INDEX", the entire contents of which is hereby incorporated by reference herein, which claims priority from Chinese Patent Application Number CN201611194037.8, filed at the State Intellectual Property Office on Dec. 21, 2016, China, entitled "A METHOD AND DEVICE FOR CREATING AN INDEX", the entire contents of which is also hereby incorporated by reference herein.

FIELD

Embodiments of the present disclosure generally relate to document index, and in particular to a method and device for creating an index.

BACKGROUND

Most of the current enterprise search engines are based on an inverted index architecture. The inverted index is used to save the mapping of saving positions of a certain token in a document or a document set during a full text index. The term "token" as used herein includes at least one character in the document or the document set, for example, a letter, a word, a phrase or the like. When searching, all the documents containing the token will be searched.

However, the biggest problem suffered by this search is search efficiency and precision. It is to be understood that, for each token, there may be a large number of documents containing the token. Conversely, in one document, each token may appear several times. The solution of the conventional full text search engine assigns the same weight to various regions of a document. This greatly reduces the search efficiency and accuracy, since a token appearing in an important component (for example, a title, an abstract, and/or keyword(s)) of a document usually represents the content of the document.

SUMMARY

In order to at least partially address the above and other potential problems, embodiments of the present disclosure provide a method and device for creating an index.

In a first aspect of the present disclosure, a method for creating an index is provided. The method may comprise: dividing a document into a plurality of regions; determining the number of times that a token appears in the plurality of regions, the token including at least one character in the document; assigning respective weights to the plurality of regions; and creating an inverted document linked list directed to the token based on the number of times that the token appears in the plurality of regions and respective weights of the plurality of regions.

In some embodiments, dividing a document into a plurality of regions may comprise: dividing the document into a plurality of regions selected from the group consisting of a title, an abstract, keyword(s), a text, and/or reference(s) based on the architecture of the document.

In some embodiments, assigning respective weights to the plurality of regions may comprise: assigning respective weights to the plurality of regions based on the relevance of the plurality of regions to the document.

In some embodiments, creating an inverted document linked list directed to the token may comprise: creating a token position list for the token, the token position list including at least one position where the token appears in the document and at least one of the weights corresponding thereto; and creating the inverted document linked list directed to the token by accumulating the at least one weight. In some embodiments, the weight may be stored into a payload field of the token position list In some embodiments, creating an inverted document linked list directed to the token may comprise: creating a token position list for the plurality of regions, the token position list including at least one position where the token appears in the plurality of regions; and creating the inverted document linked list directed to the token by accumulating respective products of the number of times that the token appears in the plurality of regions and the respective weights of the plurality of regions.

In some embodiments, the method may further comprise: modifying at least one of the weights assigned to the plurality of regions In a second aspect of the present disclosure, a device for creating an index is provided. The device may comprise: at least one processing unit and at least one memory. The at least one memory may be coupled to the at least one processing unit and store instructions executed by the at least one processing unit. When being executed by the at least one processing unit, the instructions may cause the device to: dividing a document into a plurality of regions; determining the number of times that a token appears in the plurality of regions, the token including at least one character in the document; assigning respective weights to the plurality of regions; and creating an inverted document linked list directed to the token based on the number of times that the token appears in the plurality of regions and respective weights of the plurality of regions.

In a third aspect of the present disclosure, a computer program product is provided. The computer program product is tangibly stored on a non-transient computer-readable medium and includes machine-executable instructions. The machine-executable instructions, when being executed, may cause the machine to execute any steps of a method described according to the first aspect.

It will be understood from the following description that the present disclosure provides a solution for creating an index. A purpose of the present disclosure is to enable improving accuracy and efficiency of a search by assigning respective weights to various regions of a document based on the architecture of the document.

Summary is provided for the purpose of introducing the selection of concepts in a simplified form, which will be further described in the following detailed description. Summary is intended neither to identify key features or essential features of the present disclosure nor to limit the scope of the present disclosure.

BRIEF DESCRIPTION OF THE DRAWINGS

The above and other objects, features and advantages of the present disclosure will become more apparent from the following detailed description of example embodiments of the present disclosure, taken in conjunction with the accompanying drawings in which, in example embodiments of the present disclosure, like reference numerals generally refer to like components.

DETAILED DESCRIPTION OF EMBODIMENTS

Figure 1:
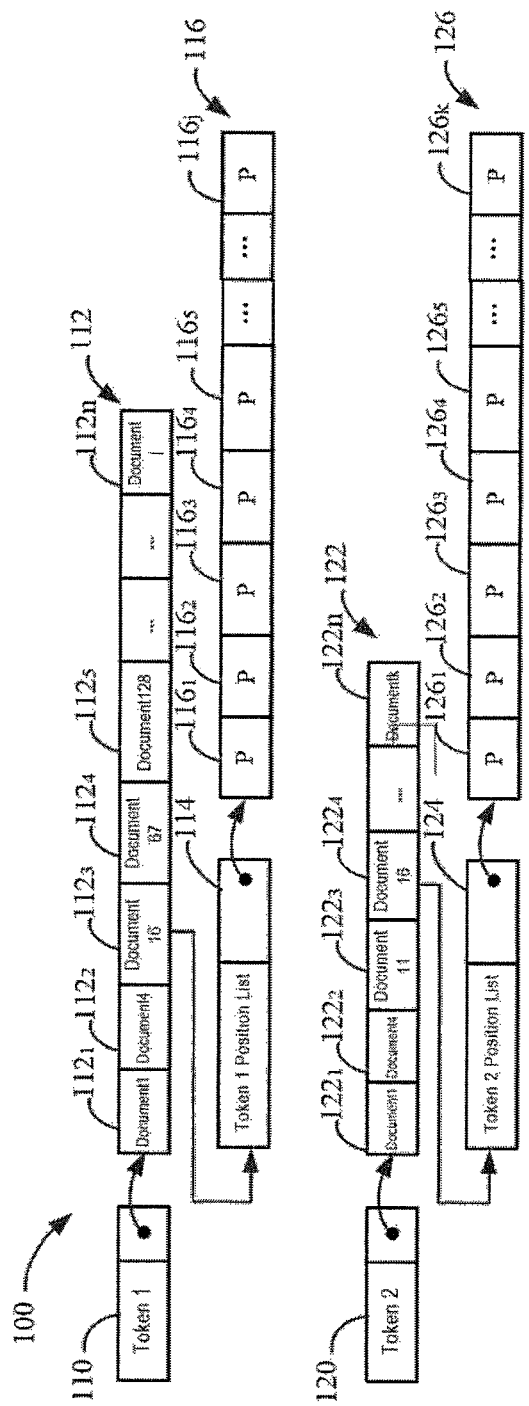
FIG. 1 schematically shows a block diagram of an index database structure 100 of a conventional full text search engine.

Preferred embodiments of the present disclosure will be described in more detail below with reference to the accompanying drawings. While the preferred embodiments of the present disclosure are shown in the drawings, it is to be understood that, the present disclosure may be embodied in various forms and should not be limited to the embodiments set forth herein. Rather, these embodiments are provided to make the disclosure more thorough and complete, and to fully convey the scope of the disclosure to those skilled in the art.

As used herein, the term "comprise" and its derivatives are inclusive, i.e. "including but not limited to." Unless otherwise stated, the term "or" means "and/or." The term "based on" means "at least partially based on." The terms "an example embodiment" and "one embodiment" means "at least one example embodiment." The term "another embodiment" means "at least one another embodiment." The terms "first", "second" and the like may refer to different or identical objects. Other explicit and implicit definitions may also be included hereafter.

As mentioned above, in a conventional full text search engine, the solution is to assign the same weight to various regions of the document, for example, the tokens appearing in the title, the abstract, the keyword(s), the text, and/or the reference(s) of the document have the same weight. However, generally, the tokens appearing in important components (for example, the title, the abstract, and/or the keyword(s)) of the document usually represent the content of the document. Thus, these important components should be assigned a higher weight, for example, the tokens appearing in the title or the abstract of the document should have a higher weight than the tokens appearing in the text.

In order to solve these and other potential problems, embodiments of the present disclosure provide a method for creating an index. The method creates an inverted document linked list directed to the tokens in the plurality of regions of a document by dividing the document into a plurality of regions and assigning respective weights to the plurality of regions. In this way, a search for a token having a weight can be performed based on the architecture of the document. This search method effectively reduces the number of less relevant documents, which significantly improves the search efficiency and accuracy.

Firstly, the general structure of a conventional full text search engine database is described with reference to FIG. 1.

FIG. 1 schematically shows a block diagram of an index database structure 100 of a conventional full text search engine. As shown in FIG. 1, in the index database structure 100 of a conventional full text search engine, each token has a document list, for example, the token 1 110 has a document list 112, which may include document 1 $112_1$, document 4 $112_2$, document 16 $112_3$, document 67 $112_4$, document 128 $112_5$ . . . document j $112_n$. The token 2 120 has a document list 122, which may include document 1 $122_1$, document 4 $122_2$, document 11 $122_3$, document 16 $122_4$ . . . document k $122_n$.

Also, each token has a document position list. For example, the token 1 110 has a token 1 position list 114 in the document 16 $112_3$ in the document list 112, which contains at least a record or indication 116 of all the positions of the token 1 appearing in the document 16 $112_3$. Similarly, the token 2 120 has a token 2 position list 124 in the document 16 $122_4$ in the document list 122, which contains a record or indication 126 of all positions of the token 2 appearing in the document 16 $122_4$.

Taking only the token 1 110 in FIG. 1 as an example, in the index database structure 100 of a conventional full text search engine, the document list 112 of token 1 110 records all the documents having the token 1 110, which, in this example, are document 1 $112_1$, document 4 $112_2$, document 16 $112_3$, document 67 $112_4$, document 128 $112_5$ . . . document j $112_n$. Regarding the document 16 $112_3$, the token 1 position list 114 of the token 1 110 contains a record 116 of all the positions of the token 1 110 appearing in the document 16 $112_3$. The position record 116 may save the position index of the token 1 110 appearing in document 16 $112_3$ by, for example, an array or a list. The value of the position index is, for example, the number, order, or any code of the positions of the token appearing in the document.

For example, in the example as shown in the drawings, the position index of the token 1 110 appearing in the document 16 $112_3$ are "3", "5", "44", "67", "124" . . . "j", thus the value of the position field $116_1$ (labeled as "P", the same below) is 3, the value of the position field $116_2$ is 5, the value of the position field $116_3$ is 44, the value of the position field $116_4$ is 67, the value of the position field $116_5$ is 124 . . . the value of the position field $116_j$ is j. It can be seen that, in the index database structure 100 of a conventional full text search engine, only all the positions (as indicated by the position record 116) of the token 1 110 appearing in the document 16 $112_3$ are recorded, and the importance of different positions of the token 1 110 appearing in document 16 $112_3$ is not presented, i.e., the position indexes, that is, "3", "5", "44", "67", "124" . . . "j", of the token 1 110 appearing in the document 16 $112_3$ are considered equally important.

Similarly, the position indexes of the token 2 120 appearing in the document 16 $122_4$ are "3", "8", "32", "68", "177" . . . "k", respectively, thus the value of the position field $126_1$ is 3, the value of the position field $126_2$ is 8, the value of the position field $126_3$ is 32, the value of the position field $126_4$ is 68, the value of the position field $126_5$ is 177 . . . the value of the position field $126_k$ is k. Also, the position indexes of the token 2 120 appearing in the document 16 $122_4$ "3", "8", "32", "68", "177" . . . "k", are considered equally important.

Figure 2:
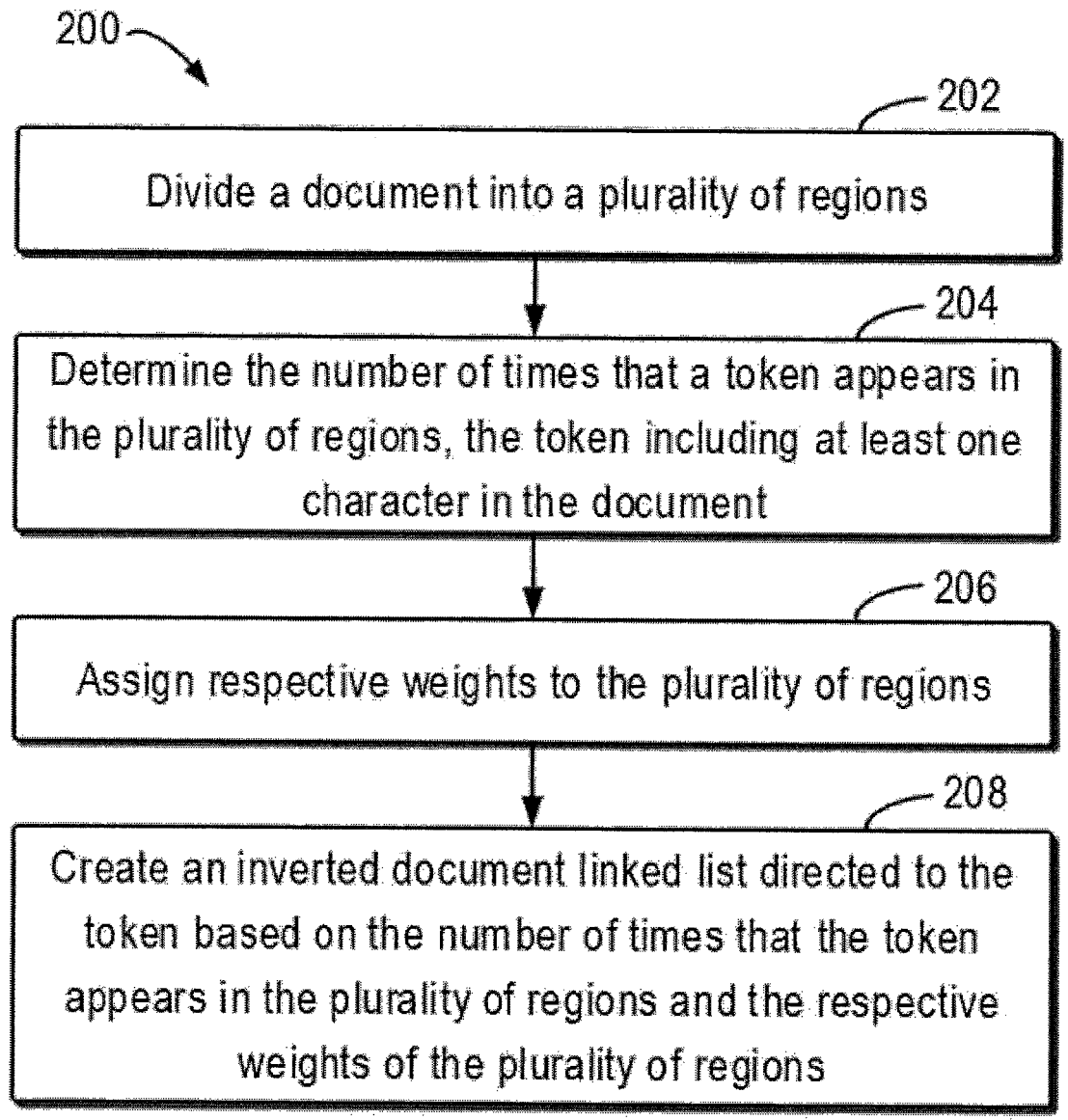
FIG. 2 schematically shows a flow diagram of a method 200 for creating an index in accordance with an embodiment of the present disclosure.

However, the inventor noticed that this is not the case. In general, the tokens appearing in important components of a document (for example, a title, an abstract, and/or keyword(s)) usually represent the content of the document. Therefore, the tokens appearing in these important components should be considered more important. In order to solve the above-mentioned problems that are present in the index database structure 100 of a conventional full text search engine, the embodiments of the present disclosure provide a new method for creating an index, the flow diagram of which is schematically shown in FIG. 2. Method 200 for creating an index according to an embodiment of the present disclosure will be described below with reference to FIG. 1.

At 202, the document is divided into multiple regions. For example, the document 16 112$_3$ in the document list 112 may be divided into a plurality of regions selected from the group consisting of a title, an abstract, keyword(s), a text, and/or reference(s) based on the document architecture. Note that, the examples of the regions given here are only example and are not intended to limit the scope of the present disclosure in any way.

At 204, the number of times that the tokens appear in the plurality of regions is determined, where the tokens may include at least one character in the document. For example, if it is assumed that the position index "3" of the token 1 110 appearing in the document 16 112$_3$ belongs to the title of the document 16 112$_3$, the token 1 110 appears for one time in the title region of the document 16 112$_3$. If it is assumed that the position index "5" of the token 1 110 appearing in document 16 112$_3$ belongs to the abstract of document 16 112$_3$, the token 1 110 appears for one time in the abstract region of the document 16 112$_3$. If it is assumed that the position indexes "44", "67", "124" and "j" of the token 1 110 appearing in the document 16 112$_3$ belong to the text of document 16 112$_3$, thus the token 1 110 appears for four times in the text regions of the document 16 112$_3$, and so on.

At 206, respective weights are assigned to the plurality of regions. In some embodiments, respective weights may be assigned to the plurality of regions based on the relevance of the plurality of regions to the document. For example, the weight 10 may be assigned to the title region, the weight 3 may be assigned to the abstract region, the weight 1 may be assigned to the text region, and so on. It will be understood by those skilled in the art that, the specific values of the assigned weights are provided by way of example only and are not intended to be limiting. Moreover, depending on different applications and demands, the weights assigned to one or more regions can be adjusted or modified.

At 208, an inverted document linked list directed to a token is created based on the number of times that this token appears appearing in the plurality of regions and respective weights of the plurality of regions. In one embodiment, for example, a position list (e.g., token 1 position list 114) is created for a token (e.g., token 1 110), the token 1 position list 114 may include the positions (e.g., as shown by position record 116 in FIG. 1) of token 1 110 appearing in a document (for example, document 16 112$_3$) and respective weights (e.g., weight 10, weight 3 and/or weight 1). Next, an inverted document linked list directed to token 1 110 is created by accumulating respective weight 10, weight 3 and/or weight 1.

In another embodiment, for example, a token position list (e.g., token position list 114 directed to a plurality of regions) is created for a plurality of regions, and the token 1 position list 114 directed to a plurality of regions may include positions of the token 1 110 appearing in a plurality of regions, for example, position index "3" appearing in the token 1 position list 114 directed to the title regions, position index "5" appearing in the token 1 position list 114 directed to the abstract regions and/or position index "44" appearing in the token 1 position list 114 directed to the text regions, etc. Next, an inverted document linked list directed to token 1 110 is created by accumulating the products of the number of times that the token 1 110 appears in the plurality of regions and the weights of corresponding regions. The operation at block 208 in the method 200 for creating an index described in FIG. 2 is described in detail below in connection with FIG. 3 and FIG. 4.

Figure 3:
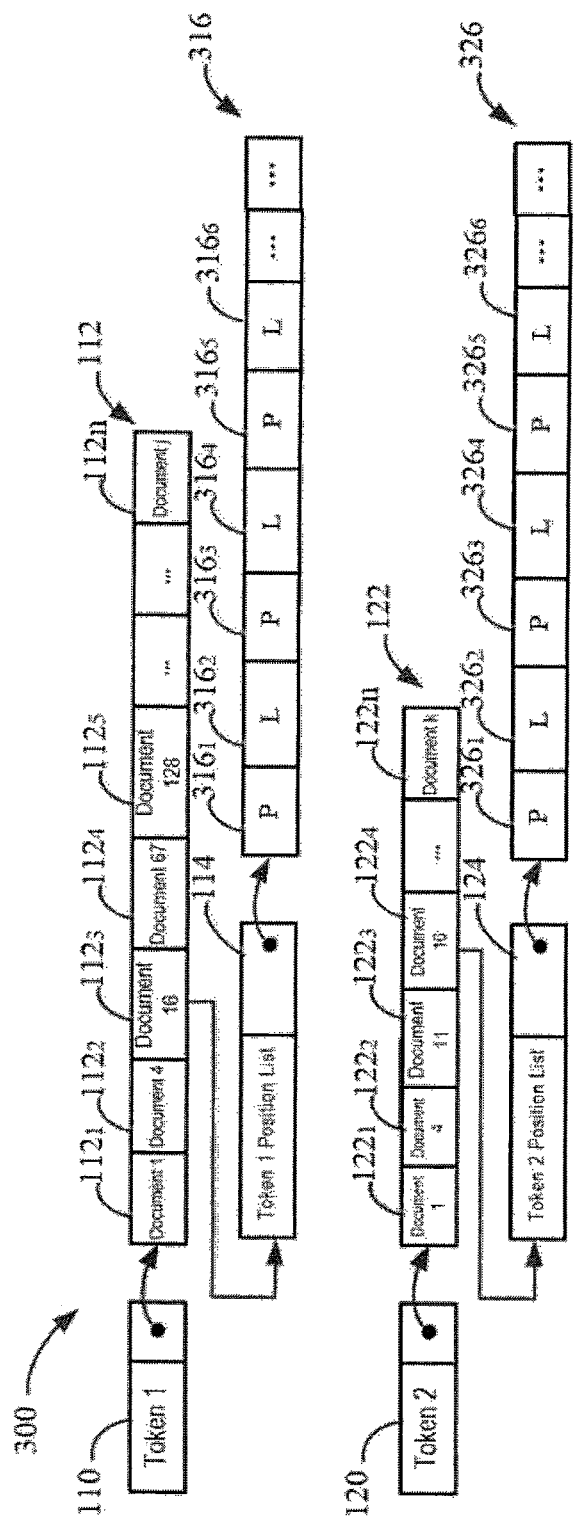
FIG. 3 schematically shows a block diagram of an index database structure 300 of a full text search engine in accordance with an embodiment of the present disclosure.

FIG. 3 schematically shows a block diagram of an index database structure 300 of a full text search engine in accordance with an embodiment of the present disclosure. For example, the data structure of the full text search engine may include a payload field (labeled as "L") that can be used to save additional information for each position of token 1 position list 114. The payload field is typically disabled, which may have a predefined default value (e.g., 0). According to an embodiment of the present invention, the payload field may be enabled to save respective weights of the regions to which the positions (e.g., position index "3", position index "5", position index "44", position index "67", position index "124" . . . position index "j") of the token 1 110 appearing in the document 16 112$_3$ belongs. Note that, this is only an example implementation, and saving the weights does not necessarily rely on the reuse of a payload field. A dedicated field may also be added to the list 114 for indicating the weight.

As shown in FIG. 3, it can be seen according to the position record 316 of token 1 110 in the document 16 112$_3$ that, in this example, the value of the position field 316$_1$ where the token 1 110 appears is "3". It can be determined from this that the token 1 110 appears in the title region of document 16 112$_3$. Correspondingly, the value of the associated payload field 316$_2$ is the respective weight value "10". As a further example, the value of the position field 316$_3$ where the token 1 110 appears is "5". It can be determined that the token 1 110 appears in the abstract region of the document 16 112$_3$. Correspondingly, the value of the associated payload field 316$_4$ is the respective weight value "3". As a further example, the value of the position field 316$_5$ where the token 1 110 appear is "44". It can be determined from this that the token 1 110 appears in the text region of the document 16 112$_3$. Correspondingly, the value of the associated payload field 316$_6$ is the respective weight value "1". An inverted document linked list directed to the token 1 110 can be created by accumulating the values of the payload field (e.g., payload fields 316$_2$, 316$_4$, 316$_6$, etc.).

Similarly, as shown in FIG. 3, it can be seen according to the position record 326 of token 2 120 in the document 16 112$_4$ that, in this example, the value of the position field 326$_1$ where the token 2 120 appears is "2". It can be determined from this that the token 2 120 appears in the title region of document 16 112$_4$. Correspondingly, the value of the associated payload field 326$_2$ is the respective weight value "3". As a further example, the value of the position field 326$_3$ where the token 2 120 appears is "8". It can be determined from this that the token 2 120 appears in the text region of the document 16 112$_4$. Correspondingly, the value of the associated payload field 326$_4$ is the respective weight value "1". As a further example, the value of the position field 326$_5$ where the token 2 120 appear is "32". It can be determined from this that the token 1 110 appears in the text region of the document 16 122$_4$. Correspondingly, the value of the associated payload field 326$_6$ is the respective weight value "1". An inverted document linked list directed to the token 2 120 can be created by accumulating the values of the payload fields (e.g., payload fields 326$_2$, 326$_4$, 326$_6$, etc.).

Figure 4:
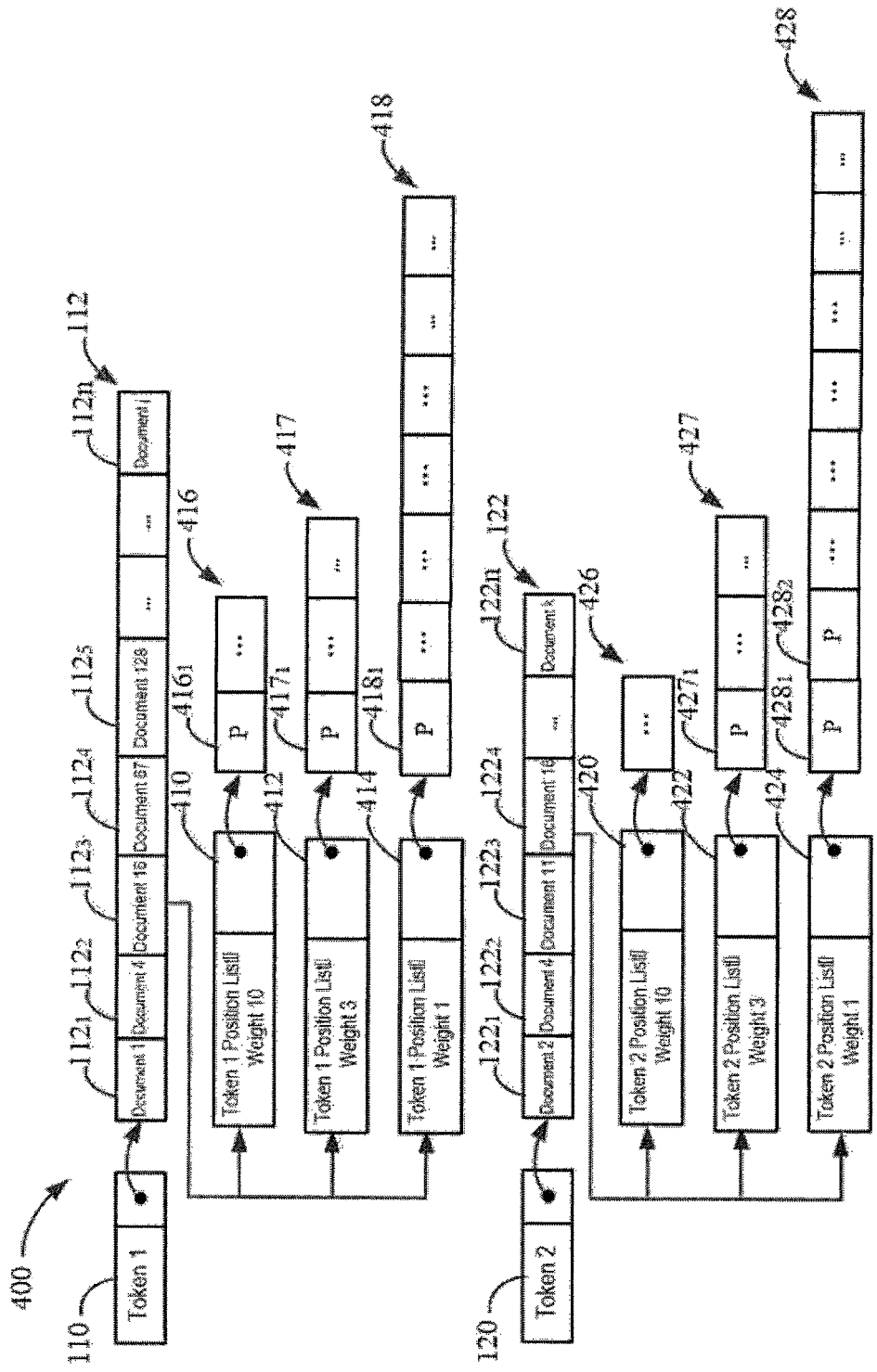
FIG. 4 schematically shows a schematic diagram of an index database structure 400 of another full text search engine in accordance with an embodiment of the present disclosure.

FIG. 4 schematically shows a schematic diagram of an index database structure 400 of another full text search engine in accordance with an embodiment of the present disclosure. Regarding the token 1 110, as shown in FIG. 4, since the plurality of regions of the document 16 112$_3$ may correspond to different weights, a token position list is created for a plurality of regions (for example, a token 1 position list 410 having a weight 10, a token 1 position list 412 having a weight 3, and a token 1 position list 414 having a weight 1). As shown in FIG. 4, it can be seen according to the position records 416, 417 and 418 of the token 1 110 in the document 16 112$_3$, in this example, the value of the position field 416$_1$ where the token 1 110 appears is "3". From this, it can be determined that the token 1 110 appears in the title region of the document 16 112$_3$. Correspondingly, the weight value of the token 1 110 is "10", therefore, the position record 416 containing the position field 416$_1$ is included in the token 1 position list 410 having the weight 10. As a further example, the value of the position field 417$_1$ where the token 1 110 appear is "5". It can be determined from this that, the token 1 110 appears in the abstract region of the document 16 112$_3$. Correspondingly, the weight value of the token 1 110 is "3", thus the position record 417 containing the position field 417$_1$ is included in the token 1 position list 412 having the weight 3. As a further example, the value of the position field 418$_1$ where the token 1 110 appears is "44". It can be determined from this that the token 1 110 appears in the text region of the document 16 112$_3$. Correspondingly, the weight value is "1", thus the position record 418 containing the position field 418$_1$ is included in the token 1 position list 414 having the weight 1. Next, an inverted document linked list directed to the token 1 110 can be created by accumulating the products of the number of times (i.e., the number of an item (i.e. 1 item) in the position record 416, the number of an item (i.e. 1 item) in the position record 417, the number of an item (i.e. 1 item) in the position record 418)) that the token 1 110 appears in the plurality of regions and the weights of corresponding position lists 410, 412 and 414 (i.e., 1*10+1*3+1*1).

Similarly, as shown in FIG. 4, it can be seen according to the position records 426, 427, and 428 of the token 2 120 in document 16 122$_4$ that, in this example, the value of the position field 427$_1$ where the token 2 120 appears is "2". It can be determined from this that the token 2 120 appears in the abstract region of the document 16 122$_4$. Correspondingly, the weight value of the token 2 120 is "3", thus the position record 427 containing the position field 427$_1$ is included in the token 2 position list 422 list having the weight 3. As a further example, the values of the position field 428$_1$ and the position field 428$_2$ where the token 2 120 appear are "8" and "32", respectively. It can be determined from this that the token 2 120 appears in the text region of the document 16 122$_4$. Correspondingly, the weight value of the token 2 120 is "1", thus the position record 428 containing the position fields 418$_1$ and 428$_2$ is included in the token 2 position list 424 having the weight 1. Next, an inverted document linked list directed to the token 2 120 can be created by accumulating the products of the number of times (i.e., the number of an item (i.e. 0 item) in the position record 426, the number of an item (i.e. 1 item) in the position record 427, the number of an item (i.e. 2 items) in the position record 428)) that the token 2 120 appears in the plurality of regions and the weights of corresponding position lists 420, 422 and 424 (i.e., 0*10+1*3+2*1).

It is to be understood that, the description in conjunction with FIGS. 3 and 4 is provided merely for those skilled in the art to better understand the spirit and principles of the disclosed embodiments, and is not intended to limit the scope of the disclosure in any way.

Figure 5:
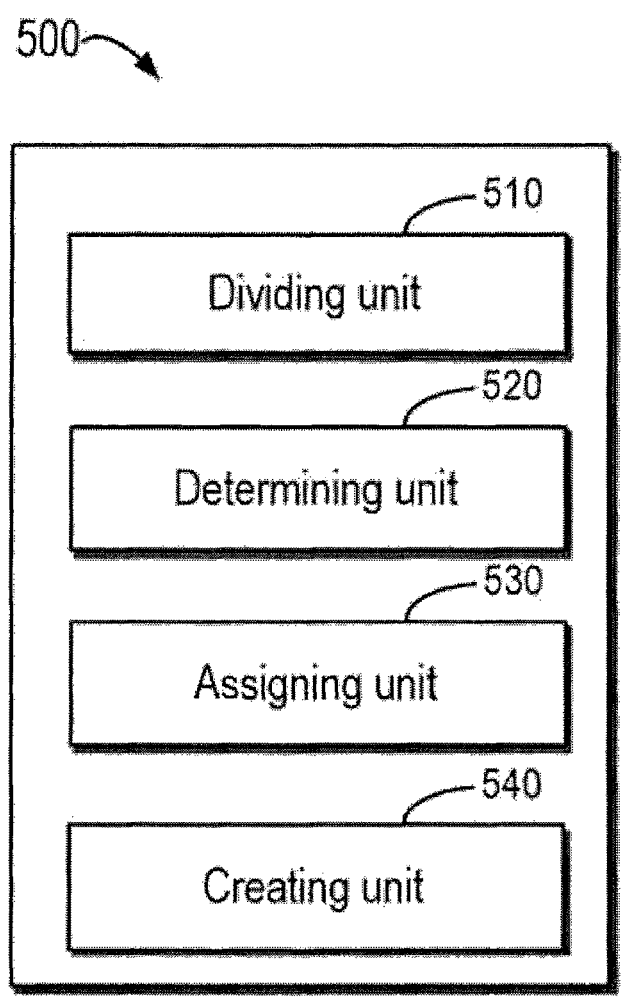
FIG. 5 schematically shows a block diagram of an apparatus 500 for creating an index according to an embodiment of the present disclosure.

FIG. 5 schematically shows a block diagram of an apparatus 500 for creating an index according to an embodiment of the present disclosure. For example, the method 200 for creating an index may be implemented by apparatus 500. As shown in FIG. 5, the apparatus 500 includes a dividing unit 510 configured to divide a document into a plurality of regions. The device 500 also includes a determining unit 520 configured to determine the number of times that a token appears in a plurality of regions, where the token includes at least one character in the document. In addition, the apparatus 500 may also include an assigning unit 530 configured to assign respective weights to a plurality of regions. And, the apparatus 500 may also include a creating unit 540 configured to create an inverted document linked list directed to the token based on the number of times that the token appears in the plurality of regions and respective weights of the plurality of regions.

For the purpose of clarity, some optional units of the apparatus 500 are not shown in FIG. 5. However, it is to be understood that, the various features described above with reference to FIGS. 1 to 4 are equally applicable to the apparatus 500. Furthermore, the various units of the apparatus 500 may be hardware units or software units. For example, in some embodiments, the apparatus 500 may be implemented in part or as a whole by using a software and/or firmware, such as a computer program product embodied by containing in a computer-readable medium. Alternatively, or in addition, the apparatus 500 may be implemented, in part or as a whole, based on a hardware, for example, being implemented as an integrated circuit (IC), an application-specific integrated circuit (ASIC), a system on a chip (SOC), a field-programmable gate array (FPGA), etc. The scope of the present disclosure is not limited in this respect.

Figure 6:
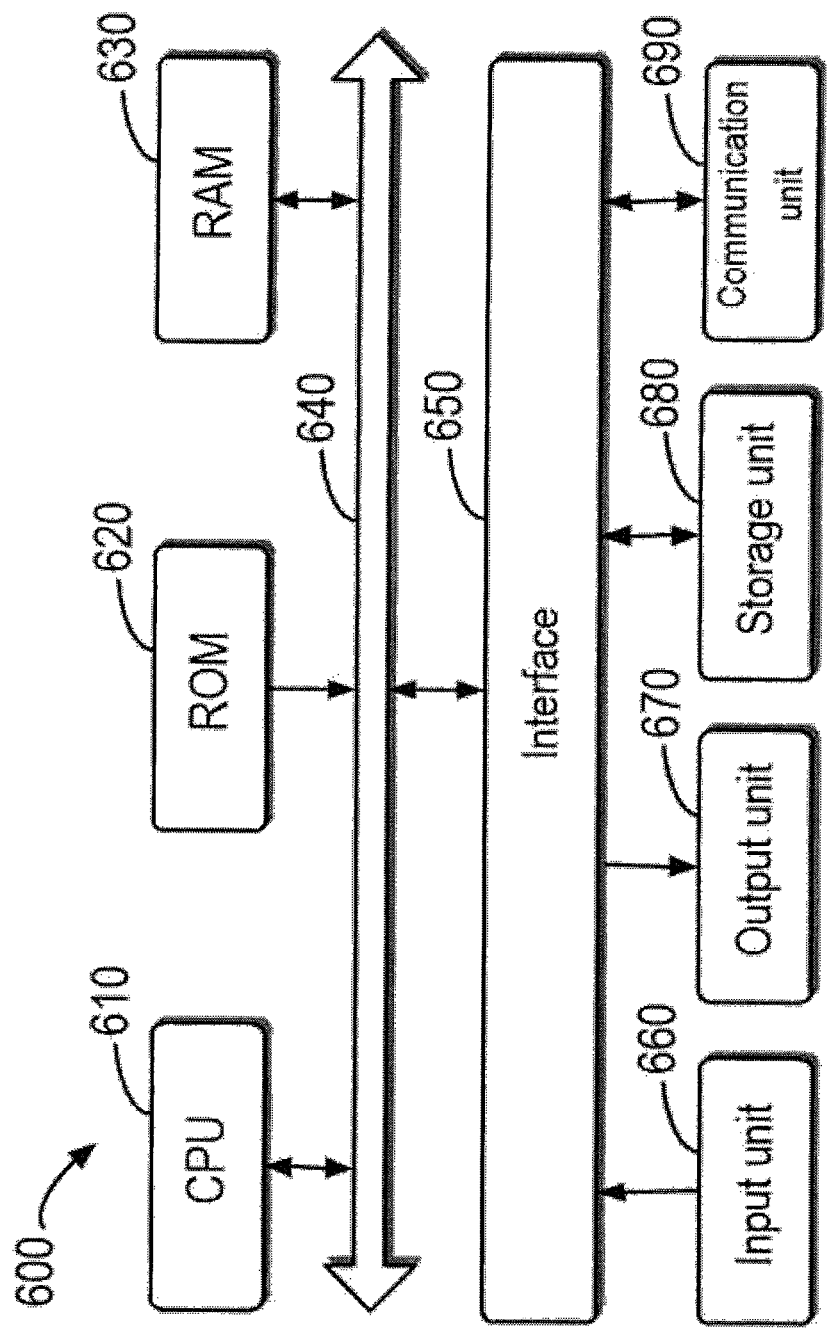
FIG. 6 schematically shows a block diagram of an example device 600 that may be used to implement embodiments of the present disclosure.

FIG. 6 schematically shows a block diagram of an example device 600 that may be used to implement embodiments of the present disclosure. As shown, the device 600 includes a central processing unit (CPU) 610 that may perform a variety of appropriate actions and processes according to computer program instructions stored in a read only memory (ROM) 620 or computer program instructions loaded from a storage unit 680 into a computer in a random access memory (RAM) 630. In the RAM 630, various programs and data required for operating the device 600 may also be stored. The CPU 610, the ROM 620, and the RAM 630 are connected to each other via a bus 640. The input/output (I/O) interface 650 is also connected to the bus 640.

A plurality of components in the device 600 are connected to an I/O interface 650, including an input unit 660 such as a keyboard, a mouse, and the like; an output unit 670 such as various types of displays, speakers, and the like; a storage unit 680, such as a magnetic disc, a compact disc and the like; and a communication unit 690 such as a network card, a modem, a wireless communication transceiver and the like. The communication unit 690 allows the device 600 to exchange information/data with other devices via a computer network such as the Internet and/or various telecommunication networks.

The various processes and processing steps described above, such as method 200, may be performed by processing unit 610. For example, in some embodiments, the method 200 may be implemented as a computer software program, which is tangibly embodied in a machine-readable medium, such as a storage unit 680. In some embodiments, part or all of the computer program may be loaded and/or installed onto the device 600 via the ROM 620 and/or the communication unit 690. When the computer program is loaded into the RAM 630 and executed by the CPU 610, one or more steps of the method 200 described above may be performed. Alternatively, the CPU 610 may also be configured to perform the method 200 described above in any other suitable manner (e.g., by means of a firmware).

The present disclosure may be a method, an apparatus, a system, and/or a computer program product. The computer program product may include a computer-readable storage medium containing computer-readable program instructions for performing various aspects of the present disclosure.

Computer readable storage mediums may be a tangible device that retains and stores instructions for use by an instruction execution device. A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions described herein may be downloaded from a computer readable storage medium to individual computing/processing devices, or downloaded to an external computer or external storage device via a network such as the Internet, local area network, wide area network and/or wireless network. The network may include copper transmission cables, optical fiber transmission, wireless transmission, routers, firewalls, switches, gateway computers and/or edge servers. The network adapter card or network interface in each computing/processing device receives computer readable program instructions from the network and forwards the computer readable program instructions so as to be stored in a computer readable storage medium in each computing/processing device.

Computer program instructions used for performing the operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computing device, partly on the user computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the Figures illustrate the architecture, operability, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical operation(s). In some alternative implementations, the operations noted in the block may occur out of the order noted in the figures. For example, two blocks shown in succession may, in fact, be executed substantially concurrently, or the blocks may sometimes be executed in the reverse order, depending upon the operability involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for creating an index, comprising:
   dividing a document into a plurality of regions, wherein the plurality of regions includes a title region and a text region;
   determining the number of times that a token appears in the plurality of regions, the token including at least one character in the document;
   assigning respective weights to the plurality of regions based on relevance of the plurality of regions to the document, wherein assigning the respective weights to the plurality of regions based on relevance of the plurality of regions includes assigning a higher weight to the title region than to the text region; and
   creating an inverted document linked list directed to the token based on the number of times that the token appears in the plurality of regions and the respective weights of the plurality of regions.

2. The method according to claim 1, wherein dividing a document into a plurality of regions comprises:
   dividing, based on a structure of the document, the document into a plurality of regions selected from a group consisting of a title, an abstract, one or more keywords, a text, and/or one or more references.

3. The method according to claim 1, wherein creating an inverted document linked list directed to the token comprises:
   creating a token position list for the token, the token position list including at least one position where the token appears in the document and at least one of the weights corresponding thereto; and
   creating the inverted document linked list directed to the token by accumulating the at least one weight.

4. The method according to claim 3, wherein the at least one weight is stored into a payload field of the token position list.

5. The method according to claim 1, wherein creating an inverted document linked list directed to the token comprises:
   creating a token position list for the plurality of regions, the token position list including at least one position where the token appears in the plurality of regions; and
   creating the inverted document linked list directed to the token by accumulating respective products of the number of times that the token appears in the plurality of regions and the respective weights of the plurality of regions.

6. The method according to claim 1, further comprising:
   modifying at least one of the respective weights assigned to the plurality of regions.

7. A device for creating an index, comprising:
   at least one processing unit; and
   at least one memory, being coupled to the at least one processing unit and storing machine-executable instructions which, when being executed by the at least one processing unit, cause the device to perform acts of:
   dividing a document into a plurality of regions, wherein the plurality of regions includes a title region and a text region;
   determining the number of times that a token appears in the plurality of regions, the token including at least one character in the document;
   assigning respective weights to the plurality of regions based on relevance of the plurality of regions to the document, wherein assigning the respective weights to the plurality of regions based on relevance of the plurality of regions includes assigning a higher weight to the title region than to the text region; and
   creating an inverted document linked list directed to the token based on the number of times that the token appears in the plurality of regions and the respective weights of the plurality of regions.

8. The device according to claim 7, wherein dividing a document into a plurality of regions comprises:
   dividing, based on a structure of the document, the document into a plurality of regions selected from a group consisting of a title, an abstract, one or more keywords, a text, and/or one or more references.

9. The device according to claim 7, wherein creating an inverted document linked list directed to the token comprises:
   creating a token position list for the token, the token position list including at least one position where the token appears in the document and at least one of the weights corresponding thereto; and
   creating the inverted document linked list directed to the token by accumulating the at least one weight.

10. The device according to claim 9, wherein the at least one weight is stored into a payload field of the token position list.

11. The device according to claim 7, wherein creating an inverted document linked list directed to the token comprises:
    creating a token position list for the plurality of regions, the token position list including at least one position where the token appears in the plurality of regions; and
    creating the inverted document linked list directed to the token by accumulating respective products of the number of times that the token appears in the plurality of regions and the respective weights of the plurality of regions.

12. The device according to claim 7, wherein the instructions, when being executed by the at least one processing unit, causes the device to:
    modifying at least one of the respective weights assigned to the plurality of regions.

13. A computer program product for creating an index, the computer program product comprising:
    a non-transitory computer readable medium encoded with computer-executable code, the code configured to enable the execution of:
    dividing a document into a plurality of regions, wherein the plurality of regions includes a title region and a text region;
    determining the number of times that a token appears in the plurality of regions, the token including at least one character in the document;
    assigning respective weights to the plurality of regions based on relevance of the plurality of regions to the document, wherein assigning the respective weights to the plurality of regions based on relevance of the plurality of regions includes assigning a higher weight to the title region than to the text region; and
    creating an inverted document linked list directed to the token based on the number of times that the token appears in the plurality of regions and the respective weights of the plurality of regions.

14. The computer program product of claim 13, wherein dividing a document into a plurality of regions comprises:
dividing, based on a structure of the document, the document into a plurality of regions selected from a group consisting of a title, an abstract, one or more keywords, a text, and/or one or more references.

15. The computer program product of claim 13, wherein creating an inverted document linked list directed to the token comprises:
creating a token position list for the token, the token position list including at least one position where the token appears in the document and at least one of the weights corresponding thereto; and
creating the inverted document linked list directed to the token by accumulating the at least one weight.

16. The computer program product of claim 15, wherein the at least one weight is stored into a payload field of the token position list.

17. The computer program product of claim 13, wherein creating an inverted document linked list directed to the token comprises:
creating a token position list for the plurality of regions, the token position list including at least one position where the token appears in the plurality of regions; and
creating the inverted document linked list directed to the token by accumulating respective products of the number of times that the token appears in the plurality of regions and the respective weights of the plurality of regions.

* * * * *